United States Patent [19]

Kariyone et al.

[11] 3,910,939
[45] Oct. 7, 1975

[54] PROCESS FOR PREPARING 1,2,5-THIADIAZOL-3-YLACETIC ACID FROM 3-METHYL-1,2,5-THIADIAZOLE

[75] Inventors: Kazuo Kariyone, Kyoto; Kunihiko Tanaka, Toyonaka; Keiji Takai, Nara, all of Japan

[73] Assignee: Fujisawa Pharmaceutical Co., Ltd., Osaka, Japan

[22] Filed: June 25, 1973

[21] Appl. No.: 372,796

[30] Foreign Application Priority Data
June 27, 1972 Japan.............................. 47-64625

[52] U.S. Cl............................. 260/302 D; 204/158
[51] Int. Cl.²...................................... C07D 285/10
[58] Field of Search................................ 260/302 D

[56] References Cited
UNITED STATES PATENTS
3,488,360    1/1970    Weinstock et al............. 260/302 D OTHER PUBLICATIONS
Katritzky et al., (eds.), Advances in Heterocidic Chemistry. Vol. 9, Academic Press, N.Y., 1968, p. 131.

*Primary Examiner*—Richard J. Gallagher
*Attorney, Agent, or Firm*—Liddy, Sullivan, Hart, Daniels & Stemple

[57] ABSTRACT

A novel process for preparing thiadiazole aliphatic carboxylic acids and the lower alkyl esters of the following formula:

$$R_1-R_2-COOR_3$$

wherein $R_1$ is a thiadiazolyl group, $R_2$ is a lower alkylidene group and $R_3$ is hydrogen or a lower alkyl group, which comprises reacting a lower alkyl substituted thiadiazole of the formula: $R_1-R_4$ wherein $R_1$ is as defined above and $R_4$ is a lower alkyl group, with a halogenating agent, reacting the resulting monohalo(lower)alkyl substituted thiadiazole of the formula: $R_1-R_2-X$ wherein $R_1$ and $R_2$ are as defined above and X is a halogen, with hydrocyanic acid or its salt, and hydrolyzing the resulting cyano(lower)alkyl substituted thiadiazole of the formula: $R_1-R_2-CN$ wherein $R_1$ and $R_2$ are as defined above, optionally prior to the hydrolysis the cyano compound being treated with a lower alcohol.

5 Claims, No Drawings

PROCESS FOR PREPARING 1,2,5-THIADIAZOL-3-YLACETIC ACID FROM 3-METHYL-1,2,5-THIADIAZOLE

The present invention relates to a novel process for preparing thiadiazole aliphatic carboxylic acids or the lower alkyl esters thereof. More particularly, it relates to a novel process for preparing thiadiazole aliphatic carboxylic acids or the lower alkyl esters of the following formula:

$$R_1-R_2-COOR_3 \quad (I)$$

wwherein $R_1$ is a thiadiazolyl group, $R_2$ is a lower alkylidene group and $R_3$ is hydrogen or a lower alkyl group.

In the specification, the thiadiazolyl group for $R_1$ means 1,2,3-thiadiazoly, 1,2,4-thiadiazolyl, 1,3,4-thiadiazolyl, or 1,2,5-thiadiazolyl; the lower alkylidene group for $R_2$ means a lower alkylidene having one to four carbon atoms, such as methylene, ethylidene, propylidene or butylidene; and the lower alkyl group for $R_3$ means a lower alkyl having one to four carbon atoms, such as methyl, ethyl, propyl, isopropyl, butyl, or isobutyl.

Among the present compounds, 1,2,5-thiadiazol-3-acetic acid has been described in U.S. Pat. No. 3,322,749, and it has been prepared by (1) treating 2,1,3-benzothiadiazole with a mixture of concentrated nitric acid and concentrated sulfuric acid, (2) reacting the resulting 4-nitro-2,1,3-benzothiadiazole with potassium permanganate, reacting the resultant with concentrated nitric acid and silver nitrate to give silver 1,2-,5-thiadiazole-3,4-dicarboxylate, and treating the resultant with hydrogen sulfide to give the corresponding dicarboxylic acid, (3) treating the dicarboxylic acid with heat to give the corresponding monocarboxylic acid, (4) reacting the resultant with thionyl chloride to give the corresponding acid chloride, (5) treating the resultant with diazomethane, (6) reacting the resulting 3-diazoacetyl compound with benzylalcohol and hydrolyzing the resulting benzyl 1,2,5-thiadiazol-3-acetate. According to the known method, many steps are needed for the preparation of the desired 1,2,5-thiadiazol-3-acetic acid and the yield is considerably low.

It has been studied to find a more advantageous process for the preparation of thiadiazole aliphatic carboxylic acids or the lower alkyl esters thereof, and there has now been found a novel process for the preparation of the desired compounds in a few steps and in higher yield.

According to the present invention, the desired thiadiazole aliphatic carboxylic acids and the lower alkyl esters thereof (I) can be prepared by reacting a lower alkyl substituted thiadiazole of the formula:

$$R_1-R_4 \quad (II)$$

wherein $R_1$ is as defined above and $R_4$ is a lower alkyl group such as methyl, ethyl, propyl or butyl, with a halogenating agent to give a monohalo(lower)alkyl substituted thiadiazole of the formula:

$$R_1-R_2-X \quad (III)$$

wherein $R_1$ and $R_2$ are as defined above and X is halogen, such as chlorine, bromine or iodine, reacting the resultant (III) with hydrocyanic acid or a salt thereof to give a cyano (lower)-alkyl substituted thiadiazole of the formula:

$$R_1-R_2-CN \quad (IV)$$

wherein $R_1$ and $R_2$ are as defined above, and hydrolyzing the resulting cyano compound (IV), optionally prior to the hydrolysis said cyano compound (IV) being treated with a lower alcohol.

The starting lower alkyl substituted thiadiazoles (II) are known compounds and for instance, 3-alkyl-1,2,5-thiadiazole is prepared by a method described in Journal of the Organic Chemistry, Vol. 32, pages 2823–2829 (1967).

In the present process, the first step comprises the reaction of a lower alkyl substituted thiadiazole (II) with a halogenating agent. As the halogenating agent, there may be used any agent which can be used for halogenation of an alkyl group, for instance, halogen (e.g. chlorine, bromine, or iodine), halogen halide (e.g. iodine chloride, iodine trichloride, or iodine bromide), sulfuryl halide (e.g. sulfuryl chloride, or sulfuryl bromide), hypohalogenous acid salt or ester (e.g. sodium hypochlorite, or ethyl hypochlorite), and N-haloacid amide or imide (e.g. N-chlorourea, N-bromoacetamide, 1,3,5-trichloro-s-triazine-2,4,6-(1H, 3H, 5H)-trione, N-bromosuccinimide, or N-bromophthalimide).

The reaction may be usually carried out in a solvent such as tetrachloromethane, chloroform, methylene chloride or ethylenechloride, or other inert solvent. The reaction is preferably carried out in the presence of a reaction accelerator, such as diaroyl peroxide (e.g. benzoyl peroxide), dialkylperoxide (e.g. di-t-butyl peroxide), ester peroxide (e.g. t-butyl perbenzoate), or an aliphatic azo compound (e.g. azobis-isobutyronitrile), or under the irradiation of light. The suitable reaction accelerator is optionally selected in accordance with the kind of halogenating agent. There is no limitation to the reaction temperature and it may be optionally carried out at room temperature or at an elevated temperature in accordance with the kind of the starting material (I) and the halogenating agent, but it is not suitable to do at so high temperature since it results in occurrence of side reaction. The halogenating agent may be preferably used in an amount of about one chemical equivalent to the starting material (II). In the above reaction, there may be occasionally produced dihalogenated or trihalogenated compound in addition to the desired monohalo(lower)alkyl substituted thiadiazole (III), but the monohalogenated compound (III) may be used in the subsequent step without isolation.

The halo(lower)alkyl substituted thiadiazole (III) thus obtained may be reacted with hydrocyanic acid or its salt to give a cyano(lower)alkyl substituted thiadiazole (IV). When hydrocyanic acid is used, the reaction may be preferably carried out in the presence of an inorganic or organic basic condensing agent, such as alkali metal (e.g. sodium, or potassium), alkaline earth metal (e.g. magnesium, or calcium), or hydroxide, alkoxide, amide, hydride, or carbonate of the alkali metal or alkaline earth metal, or an organic amine (e.g. dimethylamine, or triethylamine). The hydrocyanic acid can be used also in gaseous form. As the salt of the hydrocyanic acid, there may be used salts with any metal, such as an alkali metal or an alkaline earth metal as mentioned above or any other metal, and further the ammonium salt or a salt with the amine as mentioned above.

The above reaction may be carried out in a solvent, such as acetone, benzene, methanol, ethanol, dimethylformamide, or other inert solvent. There is no specific limitation to the reaction temperature, but it can be done enough even at room temperature.

The cyano(lower)alkyl substituted thiadiazole (IV) may be isolated, but may be used in the subsequent hydrolysis without isolation.

The cyano(lower)alkyl substituted thiadiazole (IV) obtained above is hydrolyzed to give the desired thiadiazole aliphatic carboxylic acid (I) wherein $R_3$ is hydrogen.

The hydrolysis is usually carried out in the presence of an acid or an alkali. The suitable examples of the acid may be an inorganic acid such as hydrochloric acid or sulfuric acid, and the suitable examples of the alkali may be an alkali metal hydroxide such as sodium hydroxide or potassium hydroxide, or an alkaline earth metal hydroxide such as calcium hydroxide, but any other alkali may be also used. The reaction may be carried out in a solvent such as an alcohol (e.g. methanol, ethanol), ether, dioxane, or other inert solvent. There is no specific limitation to the reaction temperature, but it may be usually carried out at room temperature or at an elevated temperature.

When the cyano(lower)alkyl substituted thiadiazole (IV) is reacted with a lower alcohol and then the resultant is hydrolyzed, the desired compound (I) wherein $R_3$ is a lower alkyl can be obtained. The lower alcohol means an aliphatic alcohol such as, methanol, ethanol, propanol, isopropanol, butanol, or isobutanol. The reaction of the cyano compound (IV) with the lower alcohol is preferably carried out in the presence of an acid catalyst, such as hydrochloric acid, aromatic sulfonic acid, or boron fluoride. The reaction may be carried out in a solvent such as ether or dioxane, but the reactant lower alcohol may be usually used also as the solvent. According to the reaction, there may be obtained an iminoether compound under anhydrous condition. However, if water is present in the reaction system, the iminoether compound may be hydrolyzed therewith to give the desired thiadiazole aliphatic carboxylic acid lower alkyl ester (I) wherein $R_3$ is a lower alkyl. Thus, the iminoether compound may be easily hydrolyzed merely by treating it with water under cooling or at room temperature to an elevated temperature, but any other hydrolysis may be also applicable.

The thiadiazole aliphatic carboxylic acid lower alkyl ester obtained above may be hydrolyzed under the similar conditions to those in the hydrolysis of the cyano(lower)-alkyl substituted thiadiazole (IV) to give the free thiadiazole aliphatic carboxylic acid (I) wherein $R_3$ is hydrogen.

The present invention is illustrated by the following examples, but not limited thereto.

EXAMPLE 1 a. Preparation of 3-bromomethyl-1,2,5-thiadiazole:

Into tetrachloromethane (100 ml) were suspended 3-methyl-1,2,5-thiadiazole (10g), N-bromosuccinimide (17. 8 b) and α,α′-azobisisobutyronitrile (1 g), and the mixture was refluxed for 45 minutes under stirring. After cooling, the reaction mixture was filtered to remove the insoluble material, and the filtrate was concentrated under reduced pressure. The residual liquid material was distilled under reduced pressure to give Fraction (A) (9.9 g) having a boiling point of 82°–85°C/7 mmHg which contained 3-bromomethyl-1,2,5-thiadiazole (8.4 g), and Fraction (B) (2.3 g) having a boiling point of 100°–103°C/7 mmHg which contained said compound (0.34 g).

I.R. spectrum (liquid film):

| Fraction (A) | Fraction (B) | |
|---|---|---|
| 3080 cm$^{-1}$ | 3080 cm$^{-1}$ | (CH in 1,2,5-thiadiazole ring) |
| 792 cm$^{-1}$ | 793 cm$^{-1}$ | (1,2,5-thiadiazole ring) |
| 724 cm$^{-1}$ | 721 cm$^{-1}$ | (CBr) |
| 703 cm$^{-1}$ | | |

U.V. spectrum (95 % ethanol):

| Fraction (A) | Fraction (B) |
|---|---|
| λmax 262.5 mµ | λmax 264 mµ | b. Preparation of 3-chloromethyl-1,2,5-thiadiazole:

Into tetrachloromethane (2 liters) were suspended 3-methyl-1,2,5-thiadiazole (200 g), 1,3,5-trichloro-s-triazine-2,4,6-(1H, 3H, 5H)-trione (232 g) and α,α′-azobisisobutyronitrile (40 g). The mixture was irradiated under stirring with white light for 4 hours so as to be weakly refluxed. After cooling, the reaction mixture was filtrated, and the filtrate was concentrated under reduced pressure. The residual liquid material was distilled under reduced pressure to give a fraction (168.5 g) having a boiling point of 83° – 96°C/30 mmHg which contained 3-chloromethyl-1,2,5-thiadiazole (about 115 g).

I.R. spectrum (liquid film):

| | |
|---|---|
| 3080 cm$^{-1}$ | (CH in 1,2,5-thiadiazole ring) |
| 792 cm$^{-1}$ | (1,2,5-thiadiazole ring) |
| 763, 740 cm$^{-1}$ | (CCl) |

U.V. spectrum (95 % ethanol);
  λmax 259 mµ

EXAMPLE 2

Preparation of 3-cyanomethyl-1,2,5-thiadiazole:

To a solution of Fraction (A) obtained in Example 1, (a) (10 g: containing 0.05 mol 3-bromoethyl-1,2,5-thiadiazole) in dimethylformamide (100 ml) was gradually added powdery sodium cyanide (2.5 g) at room temperature over a period of 30 minutes, and the mixture was stirred for 15 minutes. The reaction mixture was poured onto ice-water (200 ml) and extracted with benzene. The extract was washed with water, dried over magnesium sulfate and concentrated. The concentrated liquid was subjected to alumina column chromatography and eluted with benzene. The fraction containing 3-cyanomethyl-1,2,5-thiadiazole was separated and distilled to remove the solvent to give colorless tabular crystals (2,4 g) of 3-cyanomethyl-1,2,5-thiadiazole, M.P. 35° – 36°C.

I.R. spectrum (nujol):

| | |
|---|---|
| 3075 cm$^{-1}$ | (CH in 1,2,5-thiadiazole ring) |
| 2250 cm$^{-1}$ | (CN) |
| 801 cm$^{-1}$ | (1,2,5-thiadiazole ring) |

U.V. spectrum (95 % ethanol):
  λmax 256 mµ, 259 mµ

EXAMPLE 3

Preparation of 1,2,5-thiadiazol-3-acetic acid:

To a solution of 3-chloromethyl-1,2,5-thiadiazole (125 g) in dimethylformamide (200 ml) and methanol (100 ml) was added a catalytic amount of potassium iodide at room temperature under stirring, and thereto was further added in portions powdery sodium cyanide (60 g) in a velocity so as to maintain the mixture at 65°C. The mixture was stirred at 60°C for 30 minutes. After cooling, the reaction mixture was poured onto ice-water (500 ml). The organic layer was separated and the aqueous layer was extracted a few times with ethyl acetate. The extracts were combined with the organic layer and washed with water. The washings were further extracted twice with ethyl acetate. The extract was washed with water and then combined with the above organic layer. The organic layer thus obtained was dried over magnesium sulfate and distilled to remove the solvent to give crude 3-cyanomethyl-1,2,5-thiadiazole as a residue. To the residue were added acetic acid (200 ml) and 50 % sulfuric acid (400 ml) and the mixture was refluxed for 4 hours under stirring. The reaction mixture was poured onto ice-water (one liter) and extracted five times with ethyl acetate (total 1.5 liter). The extract was concentrated under reduced pressure, and to the residue was added 20 % aqueous sodium hydroxide to make it alkaline. The insoluble material was removed by washing with ethyl acetate. The alkaline aqueous solution was acidified at pH 1 with concentrated hydrochloric acid, and extracted four to five times with ethyl acetate (total about 1 liter). The extract was washed with small amount of saturated aqueous sodium chloride, dried over magnesium sulfate and distilled to remove the solvent to give crystalline residue. The residue was recrystallized from benzene to give 1,2,5-thiadiazol-3-acetic acid (72 g), M.P. 80°–81°C.

I.R. spectrum (nujol):
1698 cm⁻¹ (CO)
798 cm⁻¹ (1,2,5-thiadiazole ring)

EXAMPLE 4

Preparation of ethyl 1,2,5-thiadiazol-3-acetate:

To a solution of Fraction (A) obtained in Example 1, (a) (10 g: containing 0.05 mol 3-bromoethyl-1,2,5-thiadiazole) in dimethylformamide (100 ml) was gradually added powdery sodium cyanide (2.5 g) at room temperature over a period of 30 minutes under stirring, and the mixture was stirred for 15 minutes. The reaction mixture was poured onto ice-water (200 ml), and extracted with ether. The extract was washed with water, dried over magnesium sulfate and concentrated till the total amount became about 50 ml. To the concentrated liquid was added ethanol (2,3 g) and the mixture was saturated with dry hydrogen chloride gas at 5°C or less under stirring. The mixture was distilled under reduced pressure to remove the solvent. The resulting crystalline residue was dissolved in water and extracted with ethyl acetate. The extract was dried over magnesium sulfate and distilled to remove the solvent. The residue was distilled under reduced pressure to give colorless liquid ethyl 1,2,5-thiadiazol-3-acetate (2.5 g), B. P. 108°–113°C/10 – 11 mmHg.

I.R. spectrum (liquid film):
3090 cm⁻¹ (CH in 1,2,5-thiadiazole ring)
1738 cm⁻¹ (CO)
791 cm⁻¹ (1,2,5-thiadiazole ring)

EXAMPLE 5

Preparation of 1,2,5-thiadiazol-3-acetic acid:

A mixture of ethyl 1,2,5-thiadiazol-3-acetate (17.2 g), potassium hydroxide (6.5 g), methanol (100 ml) and small amount of water was allowed to stand at room temperature overnight. The reaction mixture was concentrated under reduced pressure. The resulting crystalline residue was dissolved in small amount of water and washed with ether (100 ml). The aqueous layer was made acidic at pH 1 with 10 % hydrochloric acid and extracted twice with ether (each 100 ml). The extract was washed with aqueous sodium chloride and dried over magnesium sulfate and distilled to remove the solvent to give yellow crystalline residue (10.3 g). The residue was recrystallized from benzene to give flaks (6.0 g) of 1,2,5-thiadiazol-3-acetic acid, M.P. 77°–79°C.

What is claimed is:

1. A process for preparing the compound of the formula

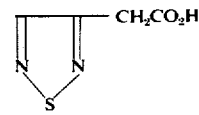

which comprises the steps:

a. halogenating the compound

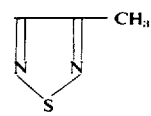

with a halogenating agent selected from the group consisting of N-bromo-succinimide and 1,3,5-trichloro-s-triazine-2,4,6-(1H, 3H, 5H)-trione in the presence of α,α'-azobisisobutyronitrile to form the compound of the formula

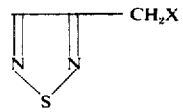

wherein X is bromine or chlorine, b. treating the compound

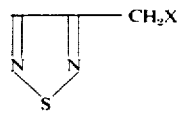

wherein X is as defined above, with hydrogen cyanide or a salt thereof to form the nitrile of the formula

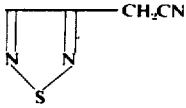

and c-1. hydrolyzing said nitrile by treatment with an acid selected from the group consisting of hydrochloric and sulfuric to the compound

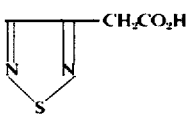

or c-2. treating said nitrile with a lower alkanol of the formula $$R_3\text{—OH}$$

wherein $R_3$ is a lower alkyl group having from one to four carbon atoms to form an ester of the formula

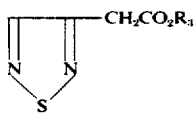

and then hydrolyzing said ester to the acid

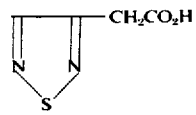

2. A process according to claim 1 wherein the salt of hydrogen cyanide is an alkali metal.

3. A process according to claim 2 wherein the alkali metal cyanide is sodium cyanide.

4. A process according to claim 3 wherein the halogenating agent is N-bromo-succinimide and X is bromine.

5. A process according to claim 3 wherein the halogenating agent is 1, 3, 5-trichloro-s-triazine-2, 4, 6-(1H, 3H, 5H)-trione and X is chlorine.

* * * * *